J. E. GORDON.
MOTOR CYCLE STAND.
APPLICATION FILED NOV. 29, 1913.

1,121,493.

Patented Dec. 15, 1914.
2 SHEETS—SHEET 1.

Witnesses
C. Anderson Jr.
V. B. Hillyard

Inventor
J. E. Gordon,
By Victor J. Evans
Attorney

J. E. GORDON.
MOTOR CYCLE STAND.
APPLICATION FILED NOV. 29, 1913.
1,121,493.
Patented Dec. 15, 1914.
2 SHEETS—SHEET 2.
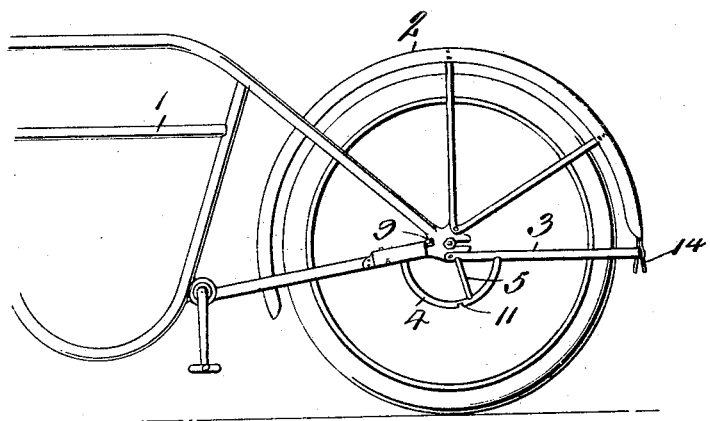
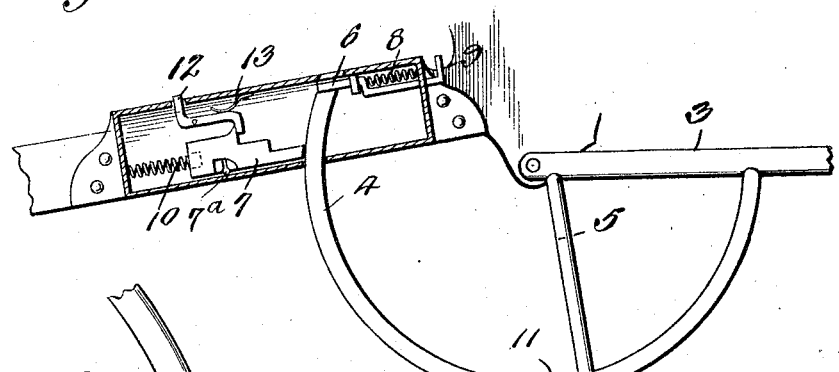
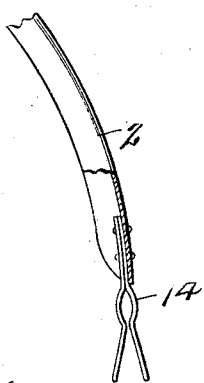

UNITED STATES PATENT OFFICE.

JAMES E. GORDON, OF SPRINGFIELD, COLORADO.

MOTOR-CYCLE STAND.

1,121,493.  Specification of Letters Patent.  Patented Dec. 15, 1914.

Application filed November 29, 1913. Serial No. 803,756.

*To all whom it may concern:*

Be it known that I, JAMES E. GORDON, a citizen of the United States, residing at Springfield, in the county of Baca and State of Colorado, have invented new and useful Improvements in Motor-Cycle Stands, of which the following is a specification.

The invention has relation to stands or supports for motor-cycles, bicycles and analogous machines, the purpose being to provide a stand which may be operated without producing noise and which may be positively held in either one of its extreme positions, thereby enabling the machine to be left unattended without fear of its misappropriation or use by unauthorized parties.

The invention consists of a stand pivotally connected to the frame of the machine so as to be turned either to hold the machine in upright position when not in use or to be turned out of the way when the machine is in service, said stand being positively secured in either one of its positions by means of a novel locking mechanism, the stand being provided with a curved rod or bar which is concentric with the pivot of the stand and said curved bar or like part coöperating with a locking mechanism to hold the stand either lowered or elevated as may be required.

The invention further provides means coöperating with the mud guard and stand whereby both are held against movement, thereby preventing rattle or other disagreeable noise incident to a play between such parts.

The invention consists of the novel features, details of construction and combination of parts, which hereinafter will be more particularly set forth, illustrated in the accompanying drawings, and pointed out in the appended claims.

Figure 1:
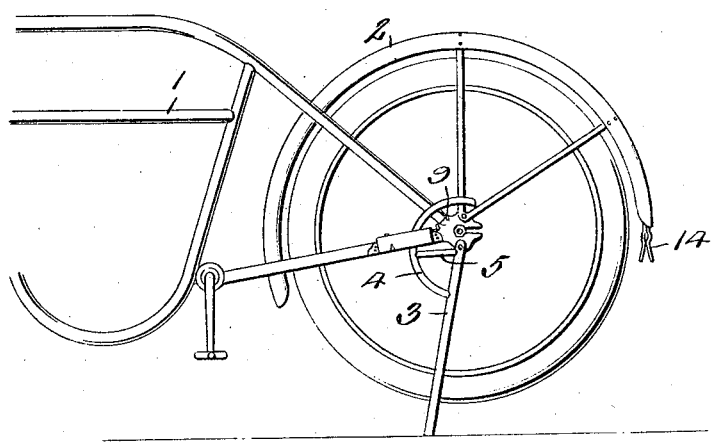
Figure 3:
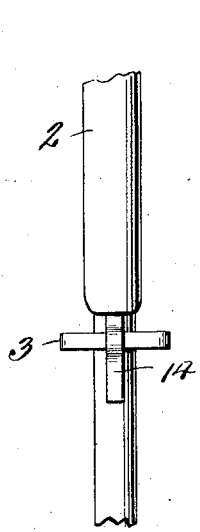
Figure 4:
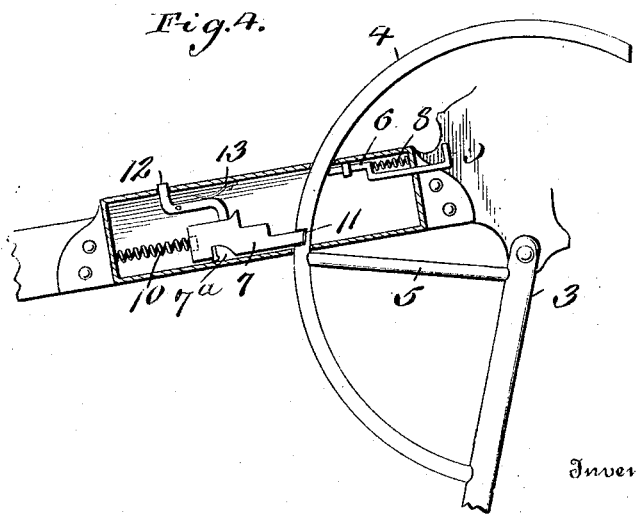

Referring to the drawings, forming a part of the specification, Figure 1 is a side view of a motor-cycle provided with a stand and locking mechanism therefor embodying the invention, said stand being lowered so as to hold the machine in upright position. Fig. 2 is a detail view, showing the position of the stand when elevated. Fig. 3 is a rear view, showing more clearly the means between the mud guard and stand for holding such parts against play. Fig. 4 is an enlarged detail view of the lock and curved bar of the stand, showing the relation of the parts when the stand is lowered to hold the machine in upright position. Fig. 5 is a view of the parts illustrated in Fig. 4, showing the stand held elevated or out of the way. Fig. 6 is a detail view of the lower rear portion of the mud guard, showing the spring holders for engaging the stands to prevent relative play of the parts.

Corresponding and like parts are referred to in the following description, and indicated in all the views of the drawings, by the same reference characters.

It is to be understood that the invention is primarily designed for motor-cycles and is shown in such connection in the accompanying drawings, but it is to be understood that it may be adapted to bicycles and kindred machines requiring a stand or support for holding the same in upright position when left unattended. The numeral 1 designates generally the frame of the motor-cycle or like machine. The numeral 2 designates the mud guard provided in connection with the rear or drive wheel. The stand is designated by the numeral 3 and is pivotally connected to the frame 1 of the machine so as to be turned up out of the way or down to hold the machine in upright position. The stand 3 may be of any construction and arrangement generally provided for machines of the type herein indicated. A curved bar 4 moves with the stand 3 and is concentric with the center of movement of such band. The curved bar 4 is located at one side of the machine and has connection with a side member of the stand and moves therewith. A stay 5 connects the curved bar 4 with the member of the stand to which said bar is attached.

A lock is located at one side of the machine and is secured to the frame thereof in any convenient and substantial way. The curved bar 4 of the stand is arranged to operate through the lock case and is adapted to be held in either of its extreme positions by means of lock bolts 6 and 7. The lock bolt 6 serves to hold the stand elevated, whereas the lock bolt 7 holds the stand when lowered into upright position for supporting the machine when left unattended. A spring 8 normally exerts a pressure on the lock bolt 6 to cause the same to engage the bar 4. A finger piece 9 is connected with the lock bolt 6 to enable such lock bolt to be withdrawn from engagement with the curved bar 4 when it is required to lower the stand into upright position. When the stand is elevated the lock bolt 6 automatically engages with the curved bar 4 to hold the stand up out of the way. It is preferred to arrange the parts so that when the stand is elevated the lock bolt 6 engages over the end of the curved bar 4. The lock bolt 7 is normally pressed forward by means of a spring 10 and is adapted to enter a notch 11 formed in the curved bar 4 so as to hold the stand in lowered position. A catch 12 is located within the lock case and engages the lock bolt 7 to normally hold the same out of engagement with the curved bar 4 so that the stand may be raised or lowered without requiring the manipulation of the lock bolt.

When it is required to lock the stand in lowered position the catch 12 is pressed upon, thereby withdrawing such catch from engagement with the lock bolt and enabling such lock bolt to enter the notch 11 of the bar 4 and hold the stand in lowered position. A spring 13 normally exerts a pressure upon the catch 12 to hold the same in engagement with the lock bolt 7. The parts are so arranged that when the lock bolt 7 is held retracted by means of the catch 12 the end adapted to enter the notch 11 is held a short distance from the bar 4. When pressing upon the catch 12 to release the lock bolt 7 the latter is pressed forward into engagement with the bar 4 by means of the spring 10 so that when the stand is lowered into operative position the lock bolt will enter the notch 11 and hold the stand in lowered position. So long as the lock bolt 7 is held away from the bar 4 by means of the catch 12 the stand may be raised or lowered but when the lock bolt is released from the catch 12 the stand is locked when lowered to bring the notch 11 of the bar 4 in register with the engaging end of the lock bolt 7. It is to be understood that the stand is released from the lock bolt 7 when the latter is thrown by means of a properly fitted key, it being understood that the lock bolt 7 is essentially a key operated part. The casing inclosing the lock mechanism is provided in a side with a keyhole 7ª through which the key, not shown, is adapted to be passed when it is required to throw the lock bolt 7 clear of the bar 4. When the lock bolt 7 is thrown away from the bar 4 it is held clear of such bar by means of the catch 12 in the manner stated.

A spring holder 14 is located upon the lower rear end of the mud guard 2 and is adapted to engage the lower or rear end of the stand 3, thereby preventing rattling of such part and furthermore enabling the stand to be utilized as a brace to hold the rear end of the mud guard away from the tire of the rear wheel. The spring holder 14 is secured in any manner to the rear part of the mud guard and its lower end comprises two members which are spread to form a V shaped space which is adapted to receive the lower cross piece of the stand when the latter is thrown upward out of the way.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A stand for motor-cycles and kindred machines connected to the frame of such machine to operate by means of a pivotal movement, a bar movable with the stand and curved so as to occupy a position concentric with the pivot about which such stand moves, and a lock device mounted upon the frame of the machine and adapted to engage the said curved bar to hold the stand either in lowered or elevated position.

2. A stand for motor-cycles and analogous machines having pivotal connection with the frame thereof, a curved bar movable with the stand and concentric with the pivot about which the same turns, a spring actuated lock bolt adapted to engage the curved bar to hold the stand elevated, and a key operated lock bolt adapted to engage the curved bar to hold the stand in lowered position.

3. A stand for motor-cycles and like machines having pivotal connection therewith, a curved bar movable with the stand and concentric with the pivot about which the same turns, a key operated lock bolt to engage with the curved bar to hold the stand in required position, and a catch adapted to engage the key operated lock bolt to hold the same away from the curved bar.

In testimony whereof I affix my signature in presence of two witnesses.

JAMES E. GORDON.

Witnesses:
WILLIAM M. STEWART,
EMERY WILSON.